US006319963B1

United States Patent
Coates et al.

(10) Patent No.: US 6,319,963 B1
(45) Date of Patent: Nov. 20, 2001

(54) REFLECTIVE FILM

(75) Inventors: David Coates; Mark Andrew Verrall, both of Dorset (GB)

(73) Assignee: Merck Patent Gesellschaft mit beschrankter Haftung, Darmstadt (DE)

( * ) Notice: Subject to any disclaimer, the term of this patent is extended or adjusted under 35 U.S.C. 154(b) by 0 days.

(21) Appl. No.: 09/384,029

(22) Filed: Aug. 26, 1999

(30) Foreign Application Priority Data

Aug. 26, 1998 (EP) .................................................. 98116104

(51) Int. Cl.[7] .............................. C08F 2/46; C09K 19/00; C09K 19/58
(52) U.S. Cl. ................................ 522/1; 428/1.1; 428/1.2; 428/1.31; 252/299.01; 252/299.3; 430/20
(58) Field of Search ..................................... 428/1.1, 1.31, 428/1.2; 430/20; 252/299.1, 299.3; 522/1

(56) References Cited

U.S. PATENT DOCUMENTS

| | | | |
|---|---|---|---|
| 4,962,163 | * 10/1990 | Hefner, Jr. et al. | 525/463 |
| 5,024,785 | * 6/1991 | Hefner, Jr. et al. | 252/299.01 |
| 5,066,750 | * 11/1991 | Hefner, Jr. et al. | 526/273 |
| 5,460,860 | * 10/1995 | Herner, Jr. et al. | 428/1 |
| 5,863,457 | * 1/1999 | Hasebe et al. | 252/299.01 |
| 6,117,920 | * 9/2000 | Jolliffe et al. | 522/170 |
| 6,217,948 | * 4/2001 | Verall | 427/492 |

FOREIGN PATENT DOCUMENTS 2 315 760 * 2/1998 (GB) .

* cited by examiner

Primary Examiner—James J. Seidleck
Assistant Examiner—Sanza L. McClendon
(74) Attorney, Agent, or Firm—Millen, White, Zelano & Branigan, P.C.

(57) ABSTRACT

The invention relates to a process as described in claim of preparing a reflective film comprising a layer of a polymerized mesogenic material with helically twisted structure, wherein the helix axis is perpendicular to the film plane, and containing regions with varying helical pitch, to a reflective film obtainable by such a process, to the use of such a reflective film as reflective broadband or notch polarizer or as a multicolored film or image in liquid crystal displays, as color filter, in effect pigments, for decorative or security applications, and to a liquid crystal display comprising a liquid crystal cell and a reflective polarizer as described in the foregoing and the following, and optionally further comprising one or more compensaters or polarizers.

14 Claims, 4 Drawing Sheets

REFLECTIVE FILM

FIELD OF THE INVENTION

The invention relates to a reflective film comprising a layer of a polymerized mesogenic material with a helically twisted orientation, wherein the helix axis is perpendicular to the film, and containing regions with varying helical pitch. The invention further relates to a process of preparing such a reflective film that allows to control the pitch varation. The invention further relates to the use of such a reflective film in optical, electrooptical, information storage, decorative and security applications, and to a liquid crystal display comprising such a reflective film.

BACKGROUND AND PRIOR ART

Reflective films comprising cholesteric liquid crystal materials have been proposed in prior art for a variety of uses, inter alia for use as broadband or notch polarizers, as colour filters in displays or projection systems, and for decorative purposes like e.g. for the preparation of coloured image films or cholesteric pigment flakes.

These films usually comprise one or more layers of a cholesteric liquid crystalline material with a helically twisted orientation, wherein the helix axis is perpendicular to the film plane, and show selective reflection of light.

The bandwidth $\Delta\lambda$ of the waveband reflected by a reflective film as described above is depending on the birefringence of the mesogenic material $\Delta n$ and the pitch of the molecular helix p according to the equation $\Delta\lambda=\Delta n\times p$. Thus, the bandwidth among other factors is determined by the birefringence of the material.

For an application e.g. as broadband reflective polarizer in liquid crystal displays, it is desirable that the bandwidth of the reflective film should comprise a substantial portion of the visible wavelength range, whereas for an application as notch polarizer or as coloured reflective film e.g. for decorative or security applications, often films having a specific reflection colour are desired.

In particular broadband reflective polarizers, also known as circular polarizers, which are transmitting circularly polarized light of a broad wavelength band covering a large part of the visible spectrum, are suitable as polarizers for backlit liquid crystal displays.

If unpolarized light is incident on such a reflective polarizer, 50% of the light intensity are reflected as circularly polarized light with the same twist sense as that of the molecular helix, whereas the other 50% are transmitted. The reflected light is depolarized (or its sense of polarization is reversed) in the backlight of the display, and is redirected onto the polarizer. In this manner theoretically 100% of a given waveband of the unpolarized light incident on the reflective polarizer can be converted into circularly polarized light.

The circularly polarized light can be converted into linear polarized light by means of a quarter wave optical retarder and optionally also a compensation film.

A simple, but neither very effective nor economic way to provide a broadband reflective polarizer is to stack several reflective films with different reflection wavebands on top of each other. Recently reflective polarizers have been developed that comprise a liquid crystalline material with a helically twisted structure and a planar orientation, and are further characterized in that the pitch of the molecular helix is varying in a direction perpendicular to the layer, which leads to a large bandwidth of the reflected wavelength band.

Methods described so far for the preparation of broadband reflective polarizers from liquid crystalline precursors do have various drawbacks. The EP 0 606 940 (Broer et al.) discloses circular reflective polarizers with a bandwidth of up to 400 nm and their manufacture. This is realized by the exploitation of the diffusion of reactive mesogenes with different reactivity and chirality leading to a large variation of the cholesteric pitch, as disclosed in Broer et al. Nature, Vol. 378, pp. 467 (1995). However, this process is rather slow and in some cases even takes several minutes to complete. This is incompatible with most methods to fabricate polarizers on continuously moving substrates such as plastic films.

A process for the production of reflective films on plastic substrates is described in the WO 97/35219. Though this process is completed in the order of 15 to 30 seconds, and is thus faster than that used by Broer et al., it is nevertheless still relatively difficult with respect to the control of the resultant reflection wavelength and bandwidth of the reflective polarizer.

Furthermore, the methods described in the EP 0 606 940 and WO 97/35219 can only lead to spatially uniform characteristics of the reflective films, i.e. showing no variation of the pitch in lateral directions across the film. On the other hand, there are also applications where it is desired to have a reflective film with reflection characteristics that are spatially varying over the film, e.g. wherein different areas of the film show different reflection colours. These films are useful e.g. for information storage or as multicoloured images.

The GB 2,315,760-A discloses a polymerizable mesogenic composition that is thermochromic, i.e. it shows a change of the reflection colour upon temperature variation, and also discloses a method to prepare a multicoloured reflective film thereof, by coating the composition as a thin, oriented layer onto a substrate, selectively heating different regions of the layer to different temperatures (e.g. by means of a laser), so that they exhibit different reflection colours, and curing the different regions to fix the respective colour.

The method described in the GB 2,315,760-A, however, is still relatively complicated and time-consuming, as several heating and curing steps are required.

Consequently there w as a need for a method to prepare reflective films with better and more easy control both of the reflection wavelength and the bandwidth of the film, as well as for a method to produce reflective films with spatially varying reflection wavelengths, wherein these films could be used as reflective polarizers, colour filters, or as coloured films for information storage or in decorative or security applications.

Definition of Terms

In connection with reflective films and optical polarization, compensation and retardation films as d described in the present application , the following definition of terms are given.

The term 'reflective film' as used in this application includes self-supporting, i.e. free-standing, films that show more or less pronounced mechanical stability and flexibility, as well as coatings or layers on a supporting substrate or between two substrates.

The term 'helix axis perpendicular to the film plane' means that the helix axis is substantially perpendicular to the film plane, i.e. substantially parallel to the film normal. This definition also includes orientations where the helix axis is tilted at an angle of up to 2° relative to the film normal.

The term 'thermodynamically stable mesophase' means the state that is obtained upon polymerization of a polymerizable mesogenic material, where the system during polymerization has sufficient time to relax to give the thermodynamically stable, highly ordered equilibrium mesophase of the polymerized material. The thermodynamically stable, equilibrium mesophase of the polymerized material can be achieved erg. by polymerizing the mesogenic material in solution, or at low polymerization rates or to low molecular weights.

The term 'homeotropic orientation' means that the optical axis of the film is substantially perpendicular to the film plane, i.e. substantially parallel to the film normal. This definition also includes films wherein the optical axis is slightly tilted at an angle of up to 2° relative to the film normal, and which exhibit the same optical properties as a film wherein the optical axis is exactly parallel to the film normal.

The terms 'tilted structure' or 'tilted orientation' means that the optical axis of the film is tilted at an angle between 0 and 90 degrees relative to the film plane.

The term 'splayed structure' or 'splayed orientation' means a tilted orientation as defined above, wherein the tilt angle additionally varies monotonuously in the range from 0 to 90°, preferably from a minimum to a maximum value, in a direction perpendicular to the film plane.

The term 'planar orientation' means that the optical axis of the film is substantially parallel to the film plane. This definition also includes films wherein the optical axis is slightly tilted relative to the film plane, with an average tilt angle throughout the film of up to 1°, and which exhibit the same optical properties as a film wherein the optical axis is exactly parallel to the film plane.

In case the reflective polarizers and homeotropic, tilted, splayed, planar and twisted retardation and compensation films as defined above comprise uniaxially positive birefringent liquid crystal material with uniform orientation, the respective orientation of the optical axis corresponds to the orientation direction of the main molecular axes of the mesogens of the liquid crystal material.

The minimum and maximum wavelengths of the waveband reflected by an inventive reflective film, i.e. the edges of the band, in this application are not given as the values for half the values of the maximum of the bands. For practical reasons the minimum and maximum wavelengths are defined as those wavelengths on the given flank where the curve has the steepest slope in absolute values, compare FIGS. 5 to 8. The bandwidth is simply given as the difference between minimum and maximum wavelength. The central reflection wavelength also called short reflection wavelength or wavelength of reflection is given as the arithmetical average of the minimum and maximum wavelength.

SUMMARY OF THE INVENTION

One aim of the invention is to provide a method of manufacturing a reflective film that does not have the above mentioned drawbacks in an efficient and cost-effective manner which is in particular suitable for mass production. Other aims of the invention are immediately evident to a person skilled in the art from the following description.

The inventors have developed a technique that allows the preparation of a reflective film on plastic substrates and is also suitable for mass production. This method comprises the steps of coating a polymerizable liquid crystalline material with a chiral nematic or cholesteric phase on a substrate or between two substrates in form of a thin layer, aligning the material so that the cholesteric helix axis is perpendicular to the plane of the layer, and polymerizing the material to freeze in the helically twisted, planar liquid crystalline phase structure.

The inventors have found that the optical properties of a reflective film prepared by this process are sensitive to the method of production of the polarizer and the type of material used in this process. In particular, the inventors found that the helical pitch and reflection wavelength, i.e. the center of the reflection band, of the reflective film can be controlled by using a polymerizable material that has a less ordered mesophase at temperatures where the polymerized material has a more highly ordered, thermodynamically stable mesophase. Also, the new production method of the instant invention allows to determine and adjust the reflection wavelength of the film by appropriately selecting the composition of the polymerizable precursor mixture and/or by varying the irradiation power.

The above mentioned aims can be achieved and the drawbacks of prior art can be overcome with a reflective film that is obtainable by a process according to the present invention.

A broadband reflective polarizer prepared by a process according to the present invention is in particular advantageous in that, when used in a liquid crystal display, it exhibits a high luminance and a considerable brightness gain compared to a conventional linear polarizer (such as e.g. a dichroic polarizer) up to large viewing angles. Furthermore, it exhibits a high temperature stability of the mechanical and optical properties.

Further it is possible by the instant method to prepare polymer cholesteric liquid crystal films with a spatial (i.e. lateral) distribution of reflection wavelengths. Thus, the films can be patterned to reflect different colours in different areas simply by exposing these different areas to different irradiation powers. One simple method is to prepare a striped pattern by exposing a layer of polymerizable mesogenic material moving on a belt to the light of the illumination source, e.g. a UV lamp, which is dimmed to various degrees e.g. in a grating type of optics or by a graded mask.

One object of the present invention is a process of preparing a reflective film comprising a polymerized mesogenic material with helically twisted structure and varying helical pitch, by polymerizing a polymerizable mesogenic material in its helically twisted mesophase, characterized in that the pitch variation is achieved by polymerizing at a temperature where the polymerizable material has a less ordered mesophase and the polymerized material has a more highly ordered thermodynamically stable mesophase. and/or by polymerizing a polymerizable mesogenic material comprising
  a) at least one polymerizable chiral or achiral mesogenic compound,
  b) at least one chiral compound, which can be also be the compound of component a), d), e) or f),
  c) at least one polymerization initiator,
  d) optionally at least one crosslinking agent,
  e) optionally at least one chain termination or chain transfer agent,
  f) optionally a dye component comprising at least one dye, and varying amount and type of component c) and/or d) and/or e) and/or f).

Another object of the invention is a reflective film obtainable by a process as described in the foregoing and the following.

Another object of the invention is the use of an inventive reflective film as reflective broadband or notch polarizer or as a multicoloured film or image in liquid crystal displays, as colour filter, in effect pigments, for decorative or security applications.

Another object the invention is a liquid crystal display comprising a liquid crystal cell and a reflective polarizer as described in the foregoing and the following, and optionally further comprising at least one of the following components I) an optical retardation film with a retardation which is approximately 0.25 times the central wavelength of the spectrum reflected by the reflective polarizer, II) a linear polarizer, III) a compensation film comprising a layer of an anisotropic polymer material with a homeotropic orientation, IV) a compensation film comprising a layer of an anisotropic polymer material with a tilted or splayed orientation, V) a compensation film comprising a layer of an anisotropic polymer material with a planar orientation, VI) a compensation film comprising a layer of an anisotropic polymer material with a helically twisted structure, wherein the helix axis is perpendicular to the film plane.

DETAILED DESCRIPTION OF THE INVENTION

Figure 1:
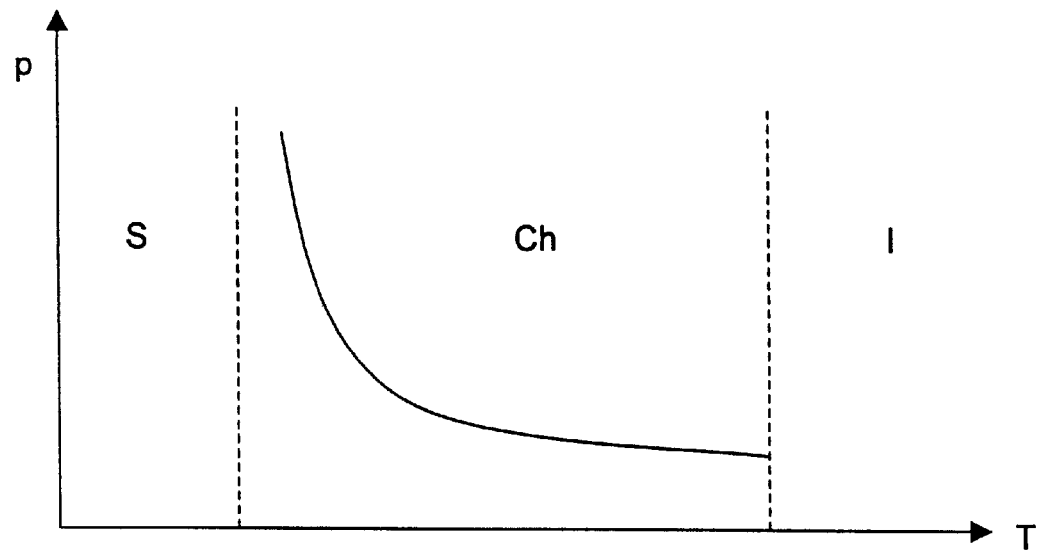
FIG. 1 schematically depicts the change of the helical pitch p versus temperature T in a prior art low molar mass liquid crystal with a cholesteric phase (Ch) and an underlying smectic phase (S).

The polymerizable mesogenic material comprises at least one chiral compound b). This chiral compound can be present in the material in addition to above components a) and c). However, it is also possible that the chiral compound b) is a chiral polymerizable compound of component a), a chiral crosslinking agent d), a chiral chain termination or chain transfer agent d) or a chiral dye f).

Preferably the reflective film exhibits a helically twisted structure wherein the helix axis is perpendicular to the film plane as defined above.

However, it is also possible that the helix axis is tilted at an angle of more than 2° relative to the film plane in different local regions of the film or throughout the film.

The reflective film is preferably prepared by coating a polymerizable mesogenic material in form of a layer onto a substrate or between two substrates, optionally aligning the material so that the axis of the molecular helix is perpendicular to the plane of the layer, polymerizing the material by exposure to actinic radiation, and optionally removing the substrates or, in case two substrates are present, one or two of the substrates from the polymerized material.

A preferred embodiment of the present invention relates to a process of preparing a reflective film as described above, wherein the pitch variation in the film is achieved by varying the irradiation power of the actinic radiation in different regions of the layer.

Preferably the polymerizable mesogenic material is a mixture of two or more compounds, at least one of which is chiral and at least one of which is polymerizable.

Preferably the polymerized material has a more highly ordered thermodynamically stable mesophase at a temperature where the polymerizable mesogenic material has a less ordered mesophase.

Further preferred embodiments relate to a process wherein the polymerized material has an untwisted thermodynamically stable mesophase at a temperature where the polymerizable mesogenic material has a helically twisted mesophase, the polymerizable mesogenic material has a chiral nematic (cholesteric) phase, and most preferably an additional smectic phase, preferably a smectic A phase, at temperatures below the cholesteric phase, the polymerizable mixture comprises at least one crosslinking agent d), the crosslinking agent d) is a mesogenic compound, the polymerizable mixture comprises at least one chain termination or chain transfer agent e), the polymerizable mixture comprises at least one dye f), the irradiation is varied over the area of the film during polymerization of the polymerizable mesogenic material, at least one of said substrates is a plastic film, the reflective film is prepared on a single substrate, the reflection characteristics of the reflective film, like the central wavelength, shape and bandwidth of the reflected spectrum and the viewing angle dependence of these reflection characteristics, are controlled by varying the irradiation power during polymerization of the polymerizable mesogenic material, the polymerizable mesogenic material contains at least one achiral polymerizable mesogenic compound, the polymerizable mesogenic material contains no chiral polymerizable mesogenic compounds having more than one polymerizable group, and particularly preferably contains no chiral polymerizable mesogenic compounds at all, the polymerizable mesogenic material contains at least one non-polymerizable chiral compound, which is preferably mesogenic, and at least two achiral polymerizable mesogenic compounds having one polymerizable group, the polymerizable mesogenic material contains at least one non-polymerizable chiral compound, which is preferably mesogenic, and at least one achiral polymerizable mesogenic compound having two or more, preferably two, polymerizable groups, the polymerizable mesogenic material contains at least one chiral polymerizable mesogenic compound having one polymerizable group and at least one achiral polymerizable mesogenic compound having one polymerizable group, the polymerizable mesogenic material contains at least one chiral polymerizable mesogenic compound having one polymerizable group and at least one achiral polymerizable mesogenic compound having two or more, preferably two, polymerizable groups, Further preferred embodiments relate to a reflective film, wherein the helical pitch varies asymmetrically in a direction perpendicular to the film plane, the polymerized material forms a three-dimensional network, the bandwidth of the reflected wavelength band is larger than 220 nm, particularly preferably larger than 320 nm, very particularly preferably larger than 420 nm.

A preferred embodiment of the present invention relates to a reflective film, wherein the helical pitch varies asymmetrically in a direction perpendicular to the plane of the layer, i.e. with the pitch substantially increasing from a smaller value at one surface of the film to a higher value at the opposite surface of the film. Such a film is particularly useful as broadband reflective polarizer in optical displays.

Another preferred embodiment relates to a reflective film wherein the helical pitch varies spatially over the film, i.e. in lateral directions across the film plane. Such a film is particularly useful as patterned or multicolour image, e.g. for decorative uses, information storage, or for a security marking or device.

The inventive process allows an easy way to control and determine the optical performance of the reflective film. Thus, the reflection characteristics, in particular the reflection wavelength and the bandwidth, of an reflective film can be controlled by varying the irradiation power of the actinic radiation used for polymerization, and/or by appropriately selecting the polymerizable mesogenic mixtures in particular by adding a certain amount of a crosslinking agent d) and/or a chain transfer agent e) and/or a dye componente f.

The preparation of a reflective film according to the present invention is achieved by polymerizing a layer of a polymerizable mesogenic material with a helically twisted orientation, with the helix axis being oriented perpendicular to the film plane, by exposure to actinic radiation. During polymerization the helical pitch and the reflective wavelength in the forming polymer are controlled by variation of the rate, i.e. the speed, and the extent, i.e. the degree of polymerization in different locations throughout the layer.

The polymerization is graduated throughout the thickness of the layer by different absorption of the actinic radiation that starts the polymerization reaction in the layer. The difference of absorption leads to a different speed of polymerization in different regions throughout the thickness of the film.

This effect, in particular when preparing a broadband reflective film, can be further enhanced by adding to the polymerizable material a crosslinking component d) and/or a chain transfer or chain terminating agent e) and/or a dye component f) that absorbs the actinic radiation used for polymerization.

In some cases the different absorption of actinic radiation of a polymerizable mixture comprising components a) to e) above, in particular the absorption of the polymerization initiator c), is already sufficient to establish a graduated polymerization, and a dye is not needed.

The graduated polymerization as described above leads to the creation of a pitch gradient throughout the thickness of the layer that is fixed upon polymerization, and thus to a polymer film that exhibits different reflective wavelengths at different locations within the film from its top to its bottom.

Furthermore, the effect of graduated polymerization and the resulting variation of the helical pitch can be enhanced both in lateral and in thickness directions throughout the film by varying the irradiation power of the actinic radiation. Lateral variation of the irradiation power can be achieved e.g. by covering the polymerizable layer with a photomask.

The formation of the pitch gradient and methods how to control this formation will be explained in detail below.

Monofunctional polymerizable mesogenic compounds, also called monoreactive mesogens, an example for which are monoacrylates, upon polymerization yield side chain liquid crystal polymers. In typical monoreactive mesogens a flexible spacer separates the polymerizable group from the mesogenic core. Most of the typical monoreactive mesogens lead to side group polymers with phase transition temperatures which are significantly increased compared to those of the reactive mesogens.

For example the compound of formula I-1

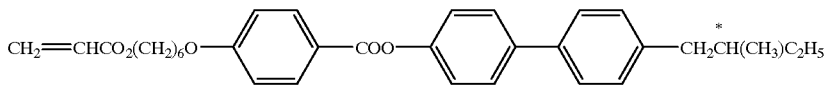

I-1 has a phase sequence of S 30° C. Ch 128° C. I (S=smectic, Ch=cholesteric, I=isotropic) whereas the corresponding side chain polymer has a phase sequence of S 145° C. Ch 190° C. I, and the compound of formula I-2

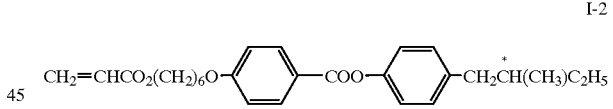

I-2 has a phase sequence of C 35° C. Ch −1° C. I whereas the corresponding side chain polymer has a phase sequence of S 50° C. Ch 65° C.I.

This shift of the transition temperatures to higher temperatures allows to polymerize a monofunctional reactive mesogen, or a mesogenic or liquid crystalline polymer precursor mixture comprising one or more monoreactive mesogens, at a selected temperature at which it is in a less ordered phase, e.g. the nematic phase, and polymerize it to give a liquid crystal side chain polymer, which at the selected polymerization temperature exhibits a different, more highly ordered phase, e.g. a smectic phase.

In the following, the invention will be exemplarily described for the case where both the monomer or precursor mixture and the polymer exhibit a cholesteric phase and an underlying smectic phase (i.e. a smectic phase at temperatures below the cholesteric phase), but wherein the temperature range of the smectic phase in the polymer is increased. This is exemplarily depicted in the below scheme, showing the liquid crystal phase sequence of a monomer and its corresponding polymer, wherein both the monomer and the polymer have a smectic and cholesteric phase. Therein S denotes a smectic phase, Ch denotes the cholesteric (=chiral nematic) phase and I denotes the isotropic phase. The arrow indicates the direction of increasing temperature T.

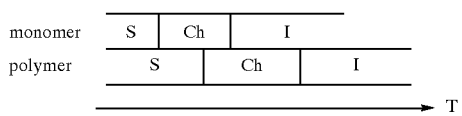

It is, however, also possible that the polymer e.g. exhibits a cholesteric and an underlying smectic phase, whereas the monomer or precursor mixture e.g. exhibits only a cholesteric phase or even only a monotropic cholesteric phase, like in case of compound I-2 above.

In an unpolymerized cholesteric liquid crystal monomer or precursor mixture with an underlying smectic phase, the helical pitch of the cholesteric helix typically unwinds to give longer reflection wavelength as the temperature is reduced towards a smectic phase. This effect is known as the thermochromic effect and is schematically depicted in FIG. 1, showing the change of the helical pitch p versus temperature T for a low molar mass cholesteric liquid crystal as described above.

Figure 2:
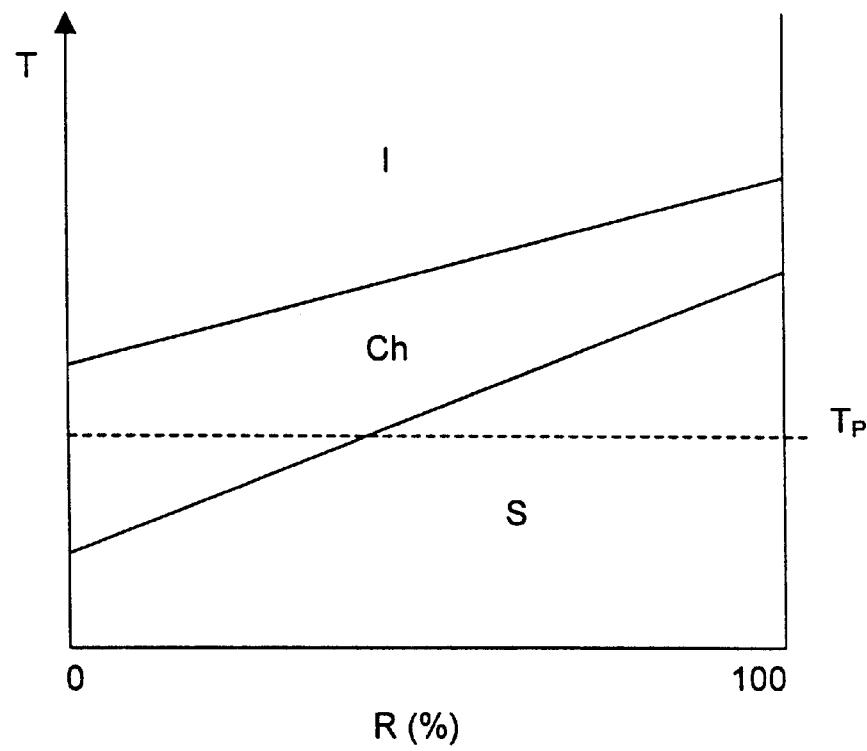
FIG. 2 schematically depicts the change of the temperature range (T) of the smectic (S) cholesteric (Ch) and isotropic (I) phase during polymerization of a cholesteric polymer precursor according to the inventive method.

If a sample of a liquid crystalline monomer or precursor mixture as described above is polymerized at a constant temperature, the smectic-cholesteric transition temperature of the sample will effectively increase during polymerization. If perfect mixing of the polymerized and unpolymerized material is assumed during polymerization, the phase diagram of such a sample would look as exemplarily depicted in FIG. 2, showing the change of the phase transition temperature T versus the ratio R of polymerized material. It should be noted that FIG. 2 is a simplified phase diagram which only schematically illustrates the above described effect, thus e.g. biphasic regions have been omitted, and the polymer is assumed to have a monodisperse molecular weight distribution.

The polymerization temperature of the above described sample can now be chosen such that during polymerization of the precursor the cholesteric-smectic phase boundary of the forming polymer will be crossed, as exemplarily indicated in FIG. 2 for the polymerization temperature $T_p$. As a consequence, the pitch of the cholesteric helix will diverge as illustrated in FIG. 1, but now at constant temperature, and the cholesteric helix will unwind in the forming polymer as the smectic phase is approached.

However, the above described behavior is ideally observed only when the reactive mesogens are polymerized in the unoriented state, e.g. in solution, and at relatively small rates and/or to low final molecular weights. Only in this case the polymerized material will exhibit its equilibrium, i.e. its thermodynamically stable, mesophase.

When, however, a monofunctional reactive mesogen is polymerized in an oriented state, e.g. as a thin film on a substrate (e.g. a glass substrate) or between two substrates, and is polymerized quickly and to a high molecular weight, the system does not relax to give the thermodynamically stable high ordered phase of the polymer, but instead the orientation that the reactive mesogen exhibited before curing becomes fixed and remains frozen in for extended periods.

For example, the compound of above formula I-1 polymerizes to a side chain polymer with a smectic phase up to 145° C., as described above. If it is, however, mixed with 0,5% of the photoinitiator TPO (2,4,6-trimethylbenzoyl-diphenylphosphine oxide), held between two glass substrates separated 5 μm from each other, heated to 80° C. and the chiral nematic liquid crystal phase aligned by slightly shearing the substrates, a blue selectively reflecting cholesteric texture is observed. After exposure to UV radiation of 5 mW/cm² (e.g. by a mercury lamp) at this temperature of 80° C. the sample maintains its appearance even after polymerization. Even after cooling to ambient temperature of 20° C. the sample remains unchanged and reflects blue light.

Thus, if a sample of a polymerizable mesogenic material having a cholesteric phase and an underlying smectic phase is polymerized at a rate much faster than the time required for unwinding the helix, the sample remains fixed in the cholesteric state due to the high viscosity of the polymer formed, which prevents relaxation into the (thermodynamically more stable) smectic phase.

If the molecular weight of the forming polymer is reduced or kept small during polymerization, the viscosity of the polymer will also be reduced. This allows some unwinding of the helix before polymerization is complete, and therefore leads to an increase of the pitch and thus to a shift of the reflection wavelength to higher wavelengths.

The methods according to the present invention enable to control the molecular weight of the forming polymer, and thereby to control the shift of pitch and reflection wavelength in the reflective polymer film.

According to a first preferred embodiment of the present invention, the molecular weight of the forming polymer is controlled or reduced by adding a selected amount of a chain termination or chain transfer agent as component e) to the polymerizable mixture. By increasing the amount of component e), an increase of the reflection wavelength in the reflective film is achieved.

When adding a chain transfer agent to the polymerizable mixture, the length of the free polymer chains and/or the length of the polymer chains between two crosslinks in the inventive polymer film can be controlled. When the amount of the chain transfer agent is increased, polymer films with decreasing polymer chain length are obtained.

In a preferred embodiment of the present invention the polymerizable mixture comprises 0.01 to 15%, in particular 0.1 to 10%, very preferably 0.5 to 5% of a chain transfer agent. By using polymerizable mesogenic mixtures comprising a chain transfer agent a reflective polarizer with increased bandwidth can be obtained. Another benefit of polymer films according to this preferred embodiment is their especially good adhesion to a substrate, in particular to a plastic film, like e.g. a TAC film.

Chain transfer or terminating agents for the preparation of polymers are known to the expert. Many of these are commercially available. As a chain transfer agent any compound known to the expert can be used. Preferably thiol compounds are used as chain terminator, for example monofunctional thiol compounds like e.g. dodecane thiol $CH_3(CH_2)_{11}SH$ or multifunctional thiol compounds like e.g. trimethylpropane tri(3-mercaptopropionate).

The molecular weight of the polymer can be reduced effectively by the use of chain transfer agents such as mercaptane or thiol compounds, a typical example of which is dodecane thiol. However, as dodecane thiol itself is not liquid crystalline and even not mesogenic, it is only soluble in a liquid crystal host in small concentrations. Typically already at concentrations of about 0.5% phase separation is observed.

Thus, preferably liquid crystalline or at least mesogenic thiol compounds are used due to their better solubility in liquid crystal hosts. Suitable chain transfer agents for the instant invention are amongst others especially those disclosed in WO 96/12209 and WO 96/25470, the entire disclosure of which is incorporated into this application by way of reference.

Suitable liquid crystalline thiol compounds are e.g. the compounds of formula III-1 and III-2

III-1

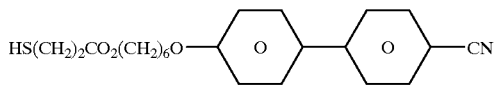

III-2

Increased concentration of chain transfer agents. e.g. of the compounds of formulae III-1 and III-2, leads to a decrease in the molecular weight of the resultant cured liquid crystalline polymer. As mentioned above, this reduces the viscosity of the forming polymer, and thus leads to faster relaxation of the polymeric precursor during polymerization and thereby to an unwinding of the cholesteric helix. Thus the wavelength of the reflection band increases with increased concentration of the chain transfer agent. This holds at least for small concentrations of the chain transfer agents of totally 0 to 10%.

Apart from the agents and additives mentioned above, oxygen can also act as chain terminator. Thus, the molecular weight of the forming polymer could be varied e.g. by controlled oxygen permeation through the substrates into the polymerizable material during polymerization. However, since controlled oxygen permeation is difficult to achieve in practice, preferably oxygen is excluded from the polymerizable material during polymerization. Oxygen exclusion can be achieved e.g. by curing under an inert gas atmosphere, or by applying oxygen barrier layers, e.g. of PVA, onto the substrates to prevent uncontrolled oxygen permeation through the substrates.

Alternatively or in addition to chain termination or chain transfer agents, the molecular weight can also be controlled by addition of polymerization retarding or inhibiting additives, such as inhibitors, stabilizers etc.. The polymerizable material preferably comprises a polymerization inhibitor as a stabilizer, to prevent undesired spontaneous polymerization for example during storage of the composition. Apart from that, however, the inhibitor can also serve to control the molecular weight of the polymer in the inventive process.

Inhibitors are commercially available in a broad variety. The inhibitors used in the present invention are preferably selected from substituted or unsubstituted derivatives of hydro-, benzo- or anthraquinones, mono-, two- or threefunctional phenols, nitro- or aminobenzenes, phenazines, phenoxazines, phenothiazines and thianthrenes. Particularly preferably the inhibitor is selected from the group comprising substituted or unsubstitued hydroquinones, anthraquinones and benzoquinones.

Typical examples for preferred inhibitor compounds are hydroquinone, methoxy methyl hydroquinone, mono-tert.-butyl hydroquinone, 2,5-di-tert.-butyl hydroquinone, p-benzoquinone, 2,5-p-dimethyl-p-benzoquinone, anthraquinone, catechol, p-tert.-butyl catechol, phenothiazine, 4-ethoxyphenol and butylated hydroxytoluene (BHT).

In case an inhibitor is added as stabilizer to prevent undesired spontaneous polymerization, the amount of the stabilizer in the polymerizable mixture is preferably from 1 to 1000 ppm, especially preferably from 10 to 500 ppm.

In case the inhibitor is used in the inventive process to control the molecular weight and thereby the variation of the e pitch length, preferably higher amounts, in particular 1 to 5% by weight, are added. Compared to chain termination or chain transfer agents, however, the use of inhibitors is less preferred.

According to a second preferred embodiment, a selected amount of a crosslinking agent d) is added to the polymerizable mixture. Thereby, the molecular weight and the degree of crosslinking of the polymer are increased, which also leads to a faster increase of the viscosity of the polymer. This suppresses the unwinding of the molecular helix and leads to a reflective film with a smaller reflection wavelength. Thus, by increasing the amount of crosslinking agent d) a decrease of the reflection wavelength in the reflective film is achieved.

However, the amount of crosslinking agent d) should not be too high, because high amounts of crosslinker lock the structure of the forming polymer too quickly and thus reduce the bandwidth of the reflective film.

Apart of the possibility to control the reflection wavelength, the use of a crosslinking agent d) is usually recommendable in order to reduce the influence of temperature on the performance of the cured polymer films, since crosslinked polymers show higher stability against temperature variation than linear polymers. Crosslinked films are also advantageous for many applications as they are solid, self supporting films.

Thus, by adding a specific amount of crosslinking agent d), it is possible to adjust not only the reflection wavelength itself of the inventive film, but also other physical properties of the film, such as the glass temperature, which are important e.g. for the temperature dependence of the optical properties of the reflective film.

Crosslinking agents, which are diireactive compounds or compounds with even more reactive sites, are known to the expert.

In a preferred embodiment of the present invention, the polymerizable mesogenic mixture contains at least one di- or multireactive polymerizable compound as crosslinking agent d). Due to their better solubility in liquid crystalline mixtures here especially di- or multireactive compounds that are mesogenic or even liquid crystalline are preferred.

Especially preferred for use as crosslinking agents d) are mesogenic diacrylates, like for example compounds of formula II-1 and II-2

II-1

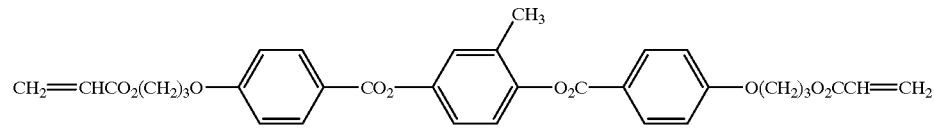

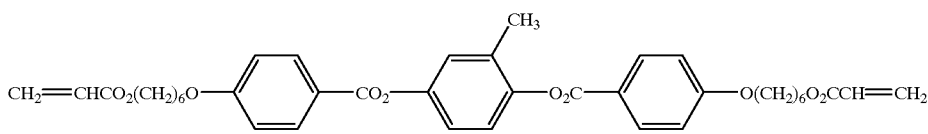

II-2

The concentration of the crosslinking agent component d) in the polymerizable mesogenic material is preferably from 0 to 35%, in particular from 2 to 25%, very preferably from 15 to 25%.

It is also possible, in order to increase crosslinking of the polymers, to add up to 20% of a non mesogenic compound with two or more polymerizable functional groups to the polymerizable mixture alternatively or in addition to the di- or multifunctional polymerizable mesogenic compounds to increase crosslinking of the polymer.

Typical examples for difunctional non mesogenic monomers are alkyldiacrylates, alkyldimethacrylates, alkyldivinylethers or alkyldivinylepoxides with alkyl groups of 1 to 20 C atoms. Typical examples for non mesogenic monomers with more than two polymerizable groups are trimethylpropanetrimethacrylate or pentaerythritoltetraacrylate.

According to a third preferred embodiment, the polymerizable mixture comprises a dye component f) containing one or more dyes. When adding a dye that absorbs actinic radiation used for polymerization, the mixture at the surface of the film facing away from the radiation source will polymerize differently compared to the mixture at the surface of the film facing the radiation source, thus producing a pitch gradient very quickly, ideally within a minute or faster.

Therefore, the use of a dye, in particular in thicker films, allows to increase the bandwidth of the light reflected by the reflective film. Thus broadband reflective polarizers both with a controlled gradient of the helical pitch (leading to a controlled bandwidth) and with a controlled central wavelength of the reflection band are accessible. Such broadband reflectors are especially preferred in the instant invention.

In a preferred embodiment the polymerizable mixture contains 0 to 20%, preferably 0.1 to 10%, in particular 0.5 to 5% by weight of a dye component f) having an absorption maximum adjusted to the wavelength of the actinic radiation used for polymerization. The dye should preferably have its maximum absorption in the same wavelength range as the polymerization initiator. Preferably, a dye is used whose absorption maximum lies outside the reflection wavelength range of the reflective film in order to exclude undesired absorptions during the use of the film.

As an example of a suitable dye, 4,4'-azoxy anisole of the formula

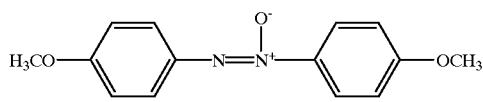

or the commercially available Merck Phase 5 (from Merck Ltd., Poole, UK) can be used. Furthermore, commercially available UV dyes such as Tinuvin (from Ciba Geigy, Switzerland) can be used.

In another preferred embodiment of the invention the polymerizable mixture contains no dye.

According to a fourth preferred embodiment, the reflection bandwidth and the central reflection wavelength are controlled by variation of the irradiation power of the actinic radiation used for polymerization.

For example, when polymerizing a cholesteric and smectic, or smectogenic, polymerizable mesogenic mixture by irradiation with UV light, e.g. with a UV lamp, decreasing lamp power will lead to a lower polymerization rate. This gives the helix more time to unwind as the smectic phase of the polymer is approached, and thus leads to an increase of the helical pitch and the reflection wavelength.

The curing power is inversely proportional to the wavelength of the reflected light for the inventive method. For example, curing with high power leads to films reflecting blue light, whereas with decreasing power the colour of the reflected light can be shifted through green, yellow and red.

Thus, the same layer of polymerizable mesogenic material can be cured with varying lamp power at a single given temperature to give reflection at different colours.

Furthermore, by varying the curing power for different spatial locations in the film, areas with different reflection colour can be achieved in one film. Just like the variation of the irradiation power at different locations within the film from its top to its bottom leads to a pitch gradient throughout the thickness of the film, the variation of the irradiation power over different regions of the film, i.e. in different areas in lateral directions across the film, leads to a difference in pitch and thus in reflection colour between these different areas of the film.

Therefore, the inventive method, amongst other applications, allows to prepare not only films with a broad waveband of reflection, but also to image multiple colours in the reflective films, e.g. by means of a graduated photomask while curing at a single temperature. Cholesteric films with spatially different reflection colours obtainable by this method can be used in a variety of different applications such as e.g. colour filters, information storage, decorative images or security images.

Preferably UV light is used to cure the films.

Particularly preferably the variation of irradiation power is used in combination with the addition of a dye to the polymerizable mesogenic material, as described for the third preferred embodiment above. The use of a dye enhances especially the formation of a gradient in the thickness direction of the film.

According to a fifth preferred embodiment of the present invention, the rate and degree of polymerization is controlled by varying the amount and type of the polymerization initiator c).

By using a higher amount of initiator, or an initiator with higher efficiency or higher sensitivity to the actinic radiation, more polymerization reactions will be started simultaneously in the polymerizable mixture, and the average molecular weight of the growing chains will be reduced, leading to a reduced viscosity and thus leads to faster relaxation of the polymeric precursor during polymerization and to an unwinding of the cholesteric helix.

Thus, by increasing the amount or efficiency of the initiator c) an increase of the reflection wavelength in the reflective film is achieved.

As a polymerization initiator for radical polymerization for example the commercially available Irgacure® or Darocure® photoinitiators (from Ciba Geigy, Basle, Switzerland ) like Irgacure 651, Irgacure 184, Darocure 1173 or Darocure 4205, or TPO (Trademark Lucirin® TPO from BASF, Ludwigshafen, Germany) can be used, whereas in case of cationic photopolymerization the commercially available UVI 6974 (Union Carbide, USA) can be used.

The polymerizable mesogenic material preferably comprises 0.01 to 10%, very preferably 0.05 to 5%, in particular 0.1 to 3% of a polymerization initiator c). UV photoinitiators are preferred, in particular radicalic UV photoinitiators.

Further to the methods described above, the reflection wavelength of the reflective film can also be controlled by varying the ratio of the achiral compounds and the chiral compounds and/or the helical twisting power (HTP) in the polymerizable mesogenic material.

Thus, the reflection wavelength in the part of the film where the pitch remains substantially unchanged during polymerization will be approximately the same as the initial reflection wavelength of the polymerizable mixture, and will be mainly controlled by the ratio and twisting power of the chiral compounds in the polymerizable mixture.

Thus, it is possible to control the minimum reflection wavelength, and thereby also the central reflection wavelength of the spectrum of an inventive reflective film by appropriate selection of the starting polymerizable material, in particular by varying the ratio of the achiral compounds and the chiral compounds and/or by varying the helical twisting power (HTP) of the chiral compounds.

In case of broadband reflective polarizers, preferably the ratio of the chiral and achiral mesogenic compounds in the starting mixture is selected so that the reflected spectrum of the resulting polymer film is covering a substantial part of the spectrum of visible light.

In case of a broadband reflective polarizer prepared by the inventive process, the waveband reflected by the polarizer is ideally covering the whole visible spectrum, and is preferably within a wavelength range from 400 to 900 nm. For most applications, a reflected waveband within a range from 450 to 800 nm is acceptable. In specific embodiments, a reflected waveband within a range from 480 to 700 nm is still suitable. The bandwidth of the wavelength band is preferably larger than 220 nm, particularly preferably larger than 320 nm, very particularly preferably larger than 420 nm.

The film thickness is also influencing the bandwidth of the reflective film. Depending on the band position and the bandwidth, the thickness is preferably from 5 to 30 $\mu$m. For bandwidths of about 300 nm or more, a thickness of 10 to 20 $\mu$m is particularly preferred. For eflective films with smaller band widths e.g. in the range from 100 to 200 nm a thickness of 1.5 to 10 $\mu$m is preferred.

The transmission versus wavelength curve of the transmission spectrum of a broadband reflective polarizer according to the present invention (as depicted, for example, in FIGS. 3 and 4) can be of symmetric or asymmetric shape. It can be unimodal, bimodal or exhibit a multiple peak distribution, which means that it can show one, two or more than two local maxima of reflection.

A preferred embodiment of the present invention is characterized in that the spectrum has an unimodal peak distribution.

The chiral compounds in the polymerizable mesogenic material can be polymerizable or not. They can also be mesogenic or even liquid crystalline. In case chiral compounds are used which are di- or multireactive polymerizable compounds, these compounds can also serve as crosslinking agents d). It is also possible that the chiral compounds are chain transfer agents e) or dyes f).

In a preferred embodiment of the present invention, the chiral compounds are polymerizable chiral compounds, preferably polymerizable chiral mesogenic compounds, in particular polymerizable liquid crystalline compounds.

In another preferred embodiment, the polymerizable mesogenic material comprises one or more non-polymerizable chiral dopants in addition or alternatively to chiral polymerizable mesogenic compounds.

Especially preferred are chiral dopants with a high helical twisting power (HTP), in particular those disclosed in the WO 98/00428. Further typically used chiral dopants are e.g. the commercially available S 1011, R 811 or CB 15 (from Merck KGaB, Darmstadt, Germany).

Especially preferred are chiral non-polymerizable dopants selected from the following formulae

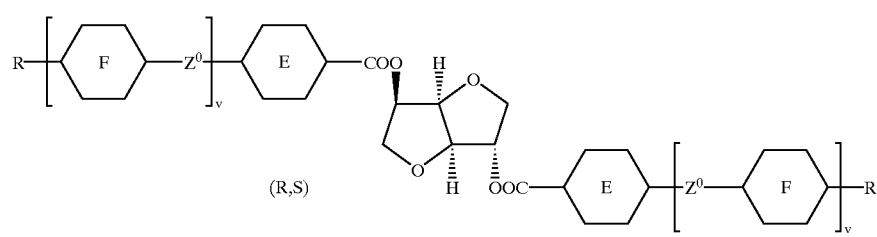

IVa

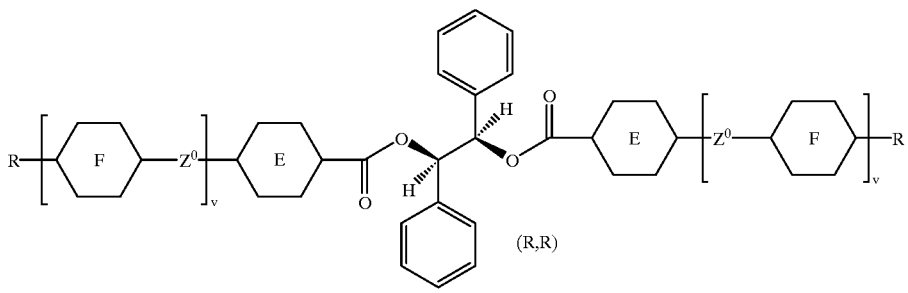

(R,R)

including the (R,S), (S,R), (R,R) and (S,S) enantiomers not shown, wherein E and F are each independently trans-1,4-cyclohexylene or optionally fluorinated 1,4-phenylene, v is 0 or 1, $Z^0$ is —COO—, —OCO—, —$CH_2CH_2$— or a single bond, and R is alkyl, alkoxy or alkanoyl with 1 to 12 C atoms.

The compounds of formula IVa and their synthesis are described in the international application WO 98/00428, the compounds of formula IVb and their synthesis are described in GB 2,328,207, with the entire disclosure of these documents being incorporated into this application by way of reference.

In a preferred embodiment of the present invention the polymerizable mesogenic material comprises no polymerizable chiral compounds, and comprises as component b) one or more chiral dopants, in particular one or more chiral dopants selected from formula IVa and IVb. The amount of chiral dopants according to this preferred embodiment is preferably less than 15%, in particular from 0.01 to 10%, very preferably from 0.01 to 5% by weight of the total mixture.

Chiral dopants with a high helical twisting power (HTP) are preferred, as already low amounts of these dopants are sufficient to induce a short helical pitch. The above chiral compounds of formula IVa and IVb exhibit a very high HTP, and are therefore particularly preferred.

As explained above, the process of controlling the pitch in the forming polymer depends inter alia on the liquid crystal phase sequences of the polymerizable mixture and the polymer, which have to be selected carefully. Especially preferred is a process wherein the polymer has a more highly ordered mesophase at temperatures where the polymerizable mesogenic material has a less ordered mesophase, in particular wherein the polymer has an untwisted mesophase at temperatures where the polymerizable mesogenic material has a helically twisted mesophase.

Especially preferably both the polymerized and the polymerizable material have a less ordered helically twisted mesophase, in particular a cholesteric phase, and a more highly ordered untwisted mesophase, in particular a smectic phase, very preferably a smectic A phase, at temperatures below the temperature range of the less ordered, helically twisted mesophase.

To obtain a reflective film with the desired molecular orientation the polymerization has to be carried out in the liquid crystal phase of the polymerizable mesogenic mixture. Therefore, preferably polymerizable mesogenic compounds or mixtures with low melting points and broad liquid crystal phase ranges are used. The use of such materials allows to reduce the polymerization temperature, for example to room temperature, which makes the polymerization process easier and is a considerable advantage especially for mass production.

The selection of suitable polymerization temperatures depends mainly on the phase transition temperatures of the polymerizable mesogenic mixture and inter alia on the softening point of the substrate.

Preferably the polymerization temperature is at least 30° below the clearing temperature of the polymerizable mesogenic mixture.

Preferably the polymerizable mesogenic mixture has a cholesteric phase and especially preferably a phase sequence S-Ch(or N*)-I, in particular a phase sequence $S_A$—Ch-I, and the resulting polymer has an equilibrium phase sequence with a smectic phase that is shifted to higher temperatures compared to the polymerizable mixture. The polymerization temperature is selected such that the polymerizable mixture is in its cholesteric phase.

Preferably the polymerization temperature is chosen such that it is close above the smectic-cholesteric phase transition temperature of the polymerizable mixture, in particular in the range from 5 to 100° C., especially preferably from 10 to 60° C., very preferably from 20 to 35° C. above the smectic-cholesteric phase transition temperature of the polymerizable mixture.

On the other hand, the polymerization temperature is selected to be within the smectic phase, i.e. below the smectic-cholesteric or smectic-isotropic phase transition temperature respectively, of the resulting polymer. Preferably the polymerization temperature is 10 to 110° C., in particular 25 to 75° C. below the smectic-cholesteric or smectic-isotropic phase transition temperature of the resulting polymer.

It is also possible to select the polymerization temperature to be close to approximately the arithmetic average of the lower temperature limit of the cholesteric phase of the polymerizable mixture and the upper temperature limit of the smectic phase of the resulting polymer.

The above preferred ranges and selecting rules of the polymerization temperature strictly only hold for linear (i.e. not crosslinked) or only slightly crosslinked polymers. However, in case of highly crosslinked polymers, where phase transition temperatures can no longer be observed or determined (e.g. due to decomposition of the polymer upon heating before its phase transition), a good approximation for the phase transition temperatures of these polymers can be obtained by decreasing the degree of crosslinking to an extent just sufficient to determine the transition temperatures.

Polymerization temperatures below 120° C. are generally preferred. Especially preferred are temperatures below 90° C., in particular temperatures of 60° C. or less.

Polymerizable mesogenic compounds that can be used for the polymerizable mesogenic material are known to the expert.

The terms polymerizable mesogen, polymerizable mesogenic compound or polymerizable liquid crystal or liquid crystalline compound as used in the foregoing and the following comprise compounds with a rod-shaped, board-shaped or disk-shaped mesogenic group (i.e. a group with the ability to induce mesophase behavior in a compound comprising such a group). These compounds do not necessarily have to exhibit mesophase behavior by themselves. In a preferred embodiment of the present invention they show mesophase behavior only upon admixture with other compounds or upon polymerization of the polymerizable mesogenic compounds or the mixtures comprising them.

Preferably the polymerizable mesogenic compounds exhibit mesophase behavior on their own.

The achiral and chiral polymerizable mesogenic mono- and di- or multireactive compounds used for the instant invention can be prepared by methods which are known per se and which are described, for example, in standard works of organic chemistry such as, for example, Houben-Weyl, Methoden der organischen Chemie, Thieme-Verlag, Stuttgart Typical examples are described for example in WO 93/22397; EP 0 261 712; DE 19504224; DE 4408171, DE 4405316 and GB 2 280 445. The compounds disclosed in these documents, however, are to be regarded merely as examples that do not limit the scope of this invention.

Examples representing especially useful monoreactive chiral and achiral polymerizable mesogenic compounds are shown in the following list of compounds, which should, however, be taken only as illustrative and is in no way intended to restrict, but instead to explain the present invention:

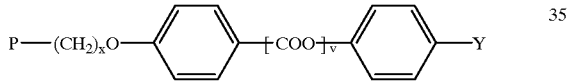
(Ia)

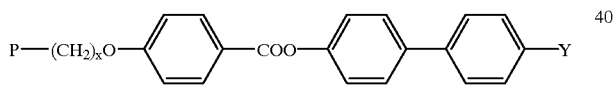
(Ib)

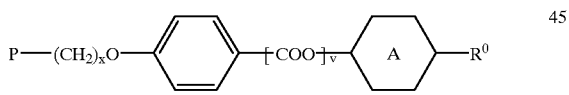
(Ic)

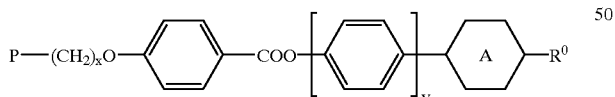
(Id)

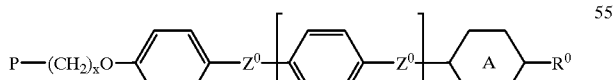
(Ie)

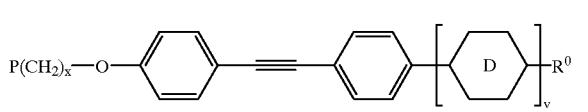
(If)

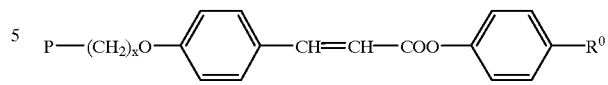
(Ig)

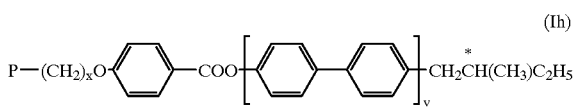
(Ih)

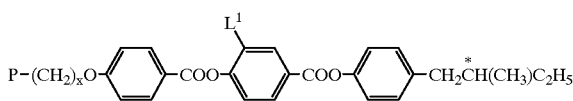
(Ii)

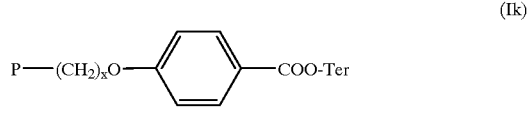
(Ik)

(Im)

(In)

(Io)

Examples of useful direactive chiral and achiral polymerizable mesogenic compounds, which can be used as crosslinkers, are shown in the following list of compounds, which should, however, be taken only as illustrative and is in no way intended to restrict, but instead to explain the present invention

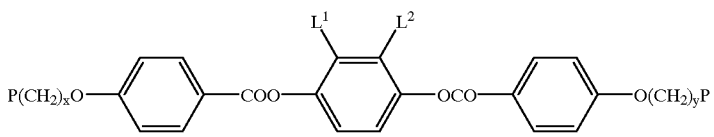

(IIa)

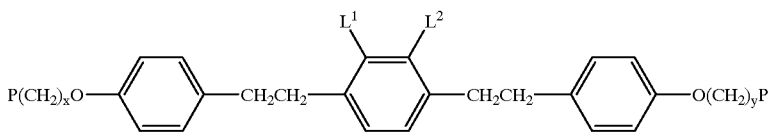

(IIb)

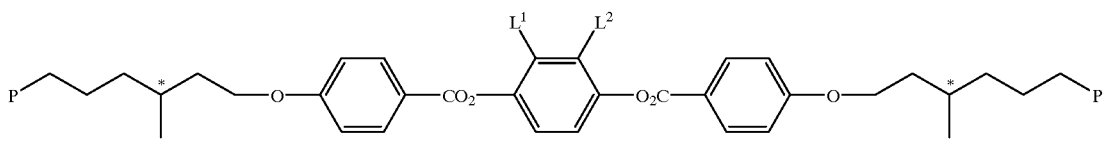

(IIc)

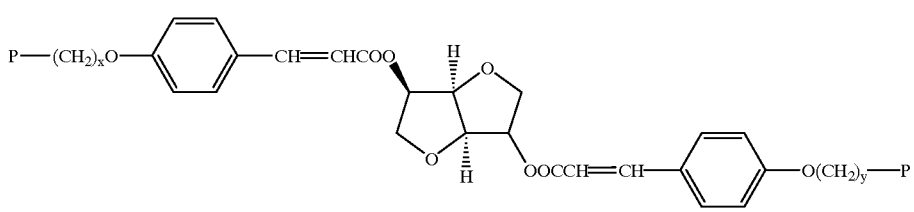

(IId)

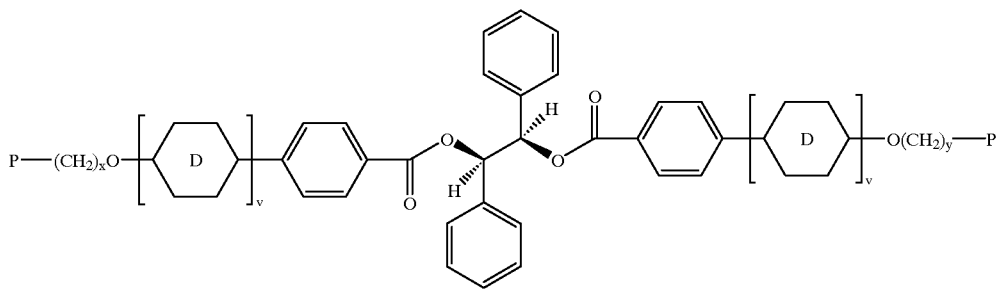

(IIe)

In the above formulae, P is a polymerizable group, preferably an acryl, methacryl, vinyl, vinyloxy, propenyl ether, epoxy or stytryl group, x and y are each independently 1 to 12, A is 1,4-phenylene that is optionally mono- di or trisubstituted by $L^1$ or 1,4-cyclohexylene, v is 0 or 1, $Z^0$ is —COO—, —OCO—, —$CH_2CH_2$— or a single bond, Y is a polar group, $R^0$ is an unpolar alkyl or alkoxy group, Ter is a terpenoid radical like e.g. menthyl, Chol is a cholesteryl group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

The term 'polar group' in this connection means a group selected from F, Cl, CN, $NO_2$, OH, $OCH_3$, OCN, SCN, an optionally fluorinated carbonyl or carboxyl group with up to 4 C atoms or a mono- oligo- or polyfluorinated alkyl or alkoxy group with 1 to 4 C atoms.

The term 'unpolar group' means an alkyl group with 1 or more, preferably 1 to 12 C atoms or an alkoxy group with 2 or more, preferably 2 to 12 C atoms.

The monoreactive compounds of the polymerizable mixture are preferably selected from the above formulae Ia to Io.

The monoreactive compounds should be selected such that the resulting polymerizable mixture has a suitable smectic-cholesteric phase transition temperature, as described for compounds I-1 and I-2 above, and polymerizes to give a polymer that is smectogenic or preferably exhibits a smectic phase. Thus mesogenic monoreactive compounds that have a nematic phase and in addition exhibit or induce smectic phase behavior are preferred.

Particularly preferred are monoreactive compounds having a nematic phase and an underlying smectic phase, in particular a smectic A phase, wherein the smectic-nematic phase transition is increased by 50 to 100° C. when polymerizing the monoreactive compound.

For specific applications, materials with high birefringence are preferred, as these help to increase the bandwidth and improve the brightness gain of the reflective polarizer. For this purpose, in particular reactive compounds comprising a tolane group, like compounds of formula If, are preferred.

The polymerizable material should be selected to exhibit a clearing point, i.e. a cholesteric-isotropic phase transition temperature at least below the temperature at which the substrate softens. Especially preferred is a material with a clearing temperature of below 100° C.

The polymerizable mesogenic compositions according to the present invention are preferably aligned in a uniform planar orientation, i.e. with the axes of the molecular helices extending substantially perpendicular to the plane of the layer. This orientation can be achieved by the use of orientation layers on one or two substrates and/or by shearing of the substrates.

According to the above described preparation of the isotropic and anisotropic layers of an inventive circular polarizer, a mixture of a polymerizable mesogenic material is coated on a substrate or between two substrates, aligned into a uniform planar orientation and cured by exposure to heat or actinic radiation in the presence of an initiator. A detailed description of this method can be found e.g. in D. J.Broer et al., Makromol.Chem. 190, 2255 ff. and 3202 ff. (1989).

As substrates for example a glass or quarz sheet as well as plastic films or sheets can be used. Isotropic or birefringent substrates can be used. In case the substrate is not removed from the polymerized film after polymerization, preferably isotropic substrates are used.

In particular for mass production it is suitable to use plastic films as substrates, like e.g. polyester films such as polyethylene-terephthalate (PET), polyvinylalcohol (PVA), polycarbonate (PC), di- or triacetylcellulose (DAC/TAC). As a birefringent substrate for example an uniaxially stretched plastic film can be used. Preferably at least one substrate is a plastic substrate, especially preferably a PVA, PET or TAC film. PET films are commercially available e.g. from ICI Corp. under the trade name Melinex®. Especially preferred are PVA substrates. Further preferred are PET substrates covered with an oxygen barrier layer, e.g. of PVA.

The substrates can be removed after polymerization or not. At least one substrate has to be transmissive for the actinic radiation used for the polymerization.

The polymerizable mesogenic material is coated on the substrate or between the substrates in form of a thin layer. This can be done by conventional techniques that are known to the skilled in the art.

It is also possible to dissolve the polymerizable mesogenic material in a suitable solvent. This solution is then coated onto the substrate and the solvent is evaporated off before curing. For this purpose, for example standard organic solvents can be used, such as ketones like e.g. methyl ethyl ketone or cyclohexanone, aromatic solvents like e.g. toluene or xylene, halogenated hydrocarbons like e.g. di- or trichloromethane, or alcohols such as e.g. methanol, ethanol or isopropyl alcohol. It is also possible to use binary, ternary or higher mixtures of the above solvents.

The coated layer of the polymerizable mesogenic material is aligned to give a planar orientation, i.e. wherein the axis of the molecular helix is perpendicular to the layer. A planar orientation can be achieved for example by shearing the material, e.g. by means of a doctor blade. Alignment can also be induced or improved by applying an electric or magnetic field to the coated material.

It is also possible that the polymerizable mesogenic material is aligned spontaneously, e.g. due to shearing forces when being coated onto the substrates or when being covered by a second substrate, due to the presence of alignment layers on top of the substrates and/or when annealing the material before polymerization. In this case a separate aligning step is not necessary.

Thus, it is also possible to apply an alignment layer, for example a layer of rubbed polyimide or sputtered $SiO_x$, on top of at least one of the substrates and/or to give rubbing treatment to at least one of the substrates.

For example rubbing can be achieved by means of a rubbing cloth, such as a velvet cloth, or with a flat bar coated with a rubbing cloth. In a preferred embodiment of the present invention rubbing is achieved by means of a at least one rubbing roller, like e.g. a fast spinning roller that is brushing across the substrate, or by putting the substrate between at least two rollers, wherein in each case at least one of the rollers is optionally covered with a rubbing cloth. In another preferred embodiment of the present invention rubbing is achieved by wrapping the substrate at least partially at a defined angle around a roller that is preferably coated with a rubbing cloth.

Furthermore, planar alignment with uniform orientation can be improved by adding one or more surfactants to the polymerizable mesogenic material. In another preferred embodiment, the shearing caused by putting together two substrates is sufficient to give good planar alignment.

The polymerizable composition according to the the present invention may also comprise one or more surfactans to improve planar alignment. Suitable surfactants are described for example in J. Cognard, Mol.Cryst.Liq.Cryst. 78, Supplement 1, 1–77 (1981). Particularly preferred are non-ionic surfactants, such as the commercially available fluorocarbon surfactants Fluorad 171 (from 3M Co.), or Zonyl FSN (from DuPont). Preferably the polymerizable mixture comprises 0.01 to 5%, in particular 0.1 to 3%, very preferably 0.2 to 2% by weight of surfactants.

Polymerization of the polymerizable mesogenic material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation.

As a source for actinic radiation for example a single UV lamp or a set of UV lamps can be used. Another possible source for actinic radiation is a laser, like e.g. a UV laser, an IR laser or a visible laser. The irradiation power is preferably from 0.2 to 12 mW/cm$^2$, in particular from 0.5 to 8.5 mW/cm$^2$, very preferably from 0.6 to 2.5 mW/cm$^2$.

For mass production short polymerization times $\leq 3$ minutes, very preferably $\leq 1$ minute, in particular $\leq 30$ seconds are preferred.

The polymerization is carried out in the presence of a polymerization initiator c) absorbing at the wavelength of the actinic radiation. For example, when polymerizing by means of UV light, a photoinitiator can be used that decomposes under UV irradiation to produce free radicals or ions that start the polymerization reaction.

When curing polymerizable mesogens with acrylate or methacrylate groups, preferably a radical photoinitiator is used, when curing polymerizable mesogens vinyl and epoxide groups, preferably a cationic photoinitiator is used.

In some cases a second substrate is used that does not only aid alignment of the polymerizable composition, but also excludes oxygen that may inhibit the polymerization. Alternatively the curing can be carried out under an atmosphere of inert gas. However, curing in air is also possible using suitable photoinitiators and high lamp power. When using a cationic photoinitiator oxygen exclusion most often is not needed, but water should be excluded. In a preferred embodiment of the invention the polymerization of the polymerizable mesogenic material is carried out under an atmosphere of inert gas, preferably under a nitrogen atmosphere.

According to an especially preferred embodiment the reflective fim is prepared by coating a layer of the polymerizable mixture onto a single substrate, i.e. without using a second substrate on top of the layer, preferably dissolved or disersed in an organic solvent. The solvent is then evaporated off and the polymerizable mixture is annealed for a short time, e.g. about one minute, at a suitable temperature in the cholesteric phase before being exposed to actinic radiation. Curing is then preferably performed in a nitrogen atmosphere.

In addition to the polymerization initiators mentioned above, the polymerizable material may also comprise one or more other suitable components such as, for example, catalysts, stabilizers, chain-transfer agents, co-reacting monomers or surface-active compounds.

It is also possible to add, for example, a quantity of up to 20% by weight of a non polymerizable liquid-crystalline compound to adapt the optical properties of the inventive optical retardation film.

In another preferred embodiment the polymerizable mixture comprises up to 70%, preferably 3 to 50% of a non mesogenic compound with one polymerizable functional group. Typical examples for monofunctional non mesogenic monomers are alkylacrylates or alkylmethacrylates.

The inventive reflective films are useful as broadband or notch polarizers, in particular as broadband reflective polarizers in liquid crystal displays, as optical or colour filters in displays or projection systems, as decorative image, for the preparation of liquid crystal or effect pigments, and especially as reflective film with spatially varying reflection colours, e.g. as multicolour image for decorative, information storage or security uses, such as non-forgeable documents like identity or credit cards, banknotes etc.

Preferably an inventive broadband reflective polarizer exhibits an asymmetrical structure of the helical pitch, with the pitch substantially increasing from a smaller, preferably a minimum, value at one edge of the film to a higher, preferably a maximum, value at the opposite edge of the film, in a direction perpendicular to the layer.

Especiall preferably the reflective polarizer has a reflection wavelength in the blue visible region at one surface and a reflection wavelength in the red visible region at the opposite surface.

Compared e.g. to a film with a symmetrical variation of the pitch and reflection wavelength, e.g. blue-red-blue, throughout the film thickness, an inventive polarizer with asymmetrical pitch variation is advantageous because it is easier to compensate, gives better off axis brightness and lower colour change.

Furthermore a polarizer with asymmetric pitch variation can be made in thinner films compared to a polarizer with the same bandwidth and symmetric pitch variation, because the former exhibits only one complete pitch gradient (e.g. blue-red) within the film thickness, whereas the latter exhibits two gradients (e.g. blue-red-blue). For example, in case of an asymmetric film having a thickness of about microns, a symmetric film with approximately the same bandwidth exhibits a thickness of 15 to 20 microns. However, thinner films are generally preferred for use in flat panel displays, and are also cheaper as they need less material.

In order to create linear polarized light, e.g. when used in a liquid crystal display, an inventive reflective polarizer is preferably used in combination with an optical retardation film. The optical retardation film is comprising a layer of a birefringent material selected such that its optical retardation is approximately 0.25 times the wavelength of the centre of the bandwidth reflected by the broadband reflective polarizer. As a result, this retarder serves as a quarter wave plate or foil (QWF) which converts circular polarized light into linear polarized light.

As a QWF for example a stretched plastic film, such as stretched PET, PVA, PC or TAC can be used. It is also possible to use a layer of an oriented polymerized liquid crystalline material.

The QWF may be connected to the reflective polarizer as a separate optical element. Preferably, the reflective polarizer and the QWF are integrated so that they form an individual optical element. This can be done for example by laminating the QWF and the reflective polarizer together after manufacturing the polarizer.

In another preferred embodiment the polymerizable mesogenic material is coated and cured directly on a QWF which serves as a substrate, thus simplifying the production process.

When a single QWF is used together with an inventive reflective polarizer, its retardation typically increases with decreasing wavelength, since the birefringence will increase towards lower wavelengths. This spread of the birefringence, which is known as dispersion, is low for some materials, like e.g. PVA, but higher for other materials, like e.g. PC and PET. This leads to a mismatch between retardation of the QWF and the wavelengths reflected by the reflective polarizer. As a result, the conversion from circularly polarized light into linearly polarized light is not optimal over the entire bandwidth of the polarizer. This can be a disadvantage in particular for broadband polarizers.

Therefore in another preferred embodiment an inventive liquid crystal display device comprises a combination of two or more optical retardation layers, the retardation of these layers being selected in such a manner that due to the difference in retardation of the layers the nett retardation of the combination is approximately 0.25 times the wavelength of the light reflected by the polarizer over a substantial portion of the reflected bandwidth of the polarizer. This combination of layers is then used as a QWF together with the inventive reflective polarizer.

In another preferred embodiment the inventive reflective polarizer and the QWF are used together with a compensation film in order to compensate the viewing angle dependence of the phase retardation of light transmitted by the reflective polarizer and/or the QWF. The compensation film can be positioned adjacent to either side of the QWF.

Preferably a compensation film is used of which the phase retardation is opposite in sign and substantially equal in magnitude to the phase retardation of the reflective polarizer over a wide range of viewing angles.

According to a preferred embodiment, the inventive broadband reflective polarizer is used together with a compensation film having homeotropic orientation, like e.g. a compensation film comprising a layer of anisotropic polymer material with a homeotropic structure. Especially preferred are homeotropic compensators as described in WO 98/00475, the entire disclosure of which is incorporated into this application by way of reference.

According to a further preferred embodiment, inventive broadband reflective polarizer is used together with one or more retardation films having a planar orientation. Particularly preferred are planar retardation films as described in WO 98/04651, the entire disclosure of which is incorporated into this application by way of reference.

According to another preferred embodiment of the present invention, the inventive broadband reflective polarizer is used in combination with one or more, preferably at least two, compensation films exhibiting a tilted or splayed orientation.

Suitable tilted and splayed compensation films are described in U.S. Pat. No. 5,619,352, WO 97/44409, WO 97/44702, WO 97/44703 and WO 98/12584, the entire disclosure of these documents being incorporated into this application by way of reference.

Especially preferably the inventive broadband reflective polarizer is used with one or more bilayers or pairs of two splayed compensation films that are rotated at 180° relative to each other, as depicted in FIG. 1b of WO 98/12584. Such a pair of splayed films has a retardation profile similar to that of a quarter wave foil and a homeotropic compensator, and can thus be used in replacement for both these elements to compensate a liquid crystal display device.

Further preferred is the use of an inventive broadband reflective polarizer in combination with a compensator comprising one or more tilted or splayed retardation films and one or more retardation films with planar orientation.

Further preferred is the use of an inventive broadband reflective polarizer in combination with a compensator comprising one or more tilted or splayed retardation films and one or more twisted retardation films, i.e. wherein the optical axis is parallel to the film plane and is twisted around an axis perpendicular to the film. Especially preferred in this connection is the use of a highly twisted film, e.g. comprising a layer of polymerized cholesteric liquid crystal material with a reflection wavelength in the UV region. Such a highly twisted film has the properties of an optically uniaxial negative planar retardation film, or negative C plate. Especially preferred are highly twisted films as described in GB 2,315,072, the entire disclosure of which is incorporated into this application by way of reference.

The retardation and compensation films used in the above preferred embodiments can be films comprising oriented and polymerized liquid crystalline material. Alternatively it is possible to use films of isotropic polymers that are uniaxially or biaxially stretched or compressed to give anisotropic optical properties, e.g. stretched resin films such as PVA, PC or polyester. Especially preferred is the combined use of an inventive reflective film with one or more negatively birefringent TAC or DAC retardation films.

Preferably liquid crystalline polymer films are used as retardation films, because these films exhibit suitable desired retardation values already at film thickness of a few microns, e.g. 1 or 2 microns, whereas in case of stretched resin films a thickness of several tens of microns, e.g. 80 to 100 microns, is required to achieve the same retardation values.

The light incident on the reflective polarizer is transformed into circularly polarized light. However, this applies only to light with a wavelength corresponding to the bandwidth of the polarizer, and to light at normal incidence, i.e. parallel to the axis of the molecular helix, whereas, for example, light passing through the reflective polarizer at an angle to the normal will become elliptically polarized. This light will not be transformed completely by the QWF into linear polarized light of a single plane of polarization.

Especially when using the inventive reflective polarizer for the illumination of a liquid crystal display cell, this elliptically polarized component of light can lead to undesired reduction of the contrast of the display. Therefore in a preferred embodiment of the present invention a linear polarizer is provided in the optical path of the display after the QWF in order to cut off the component of light emitting from the reflective polarizer which is not ideally circularly polarized.

The linear polarizer disclosed above is preferably provided such that the angle between its optical axis and the major optical axis of the QWF is ranging from 30 to 60 degrees, especially preferably between 40 and 50 degrees.

The inventive reflective polarizer and liquid crystal display can additionally comprise other film or sheet components such as diffusers, adhesive layers, protective or release layers.

The brightness gain when using a broadband reflective polarizer according to the present invention instead of a conventional linear polarizer in a liquid crystal display is preferably at least 30%, in particular at least 50%, very preferably at least 70%.

The brightness gain in this connection means the ratio of
a) the intensity of light which is transmitted after passing through an assembly, consisting of an LCD backlight, an inventive reflective polarizer, a QWF, a compensation film and a linear polarizer, and
b) the intensity of light transmitted by an assembly consisting only of the backlight and the linear polarizer of the setup described above.

The brightness gain is depending on the efficiency of the light source to re-reflect rays of light. The preferred value given above is relating to an efficient light source such as a conventional side-lit or meander type backlight.

The measured brightness gain also depends on the sample size of the reflective polarizer covering the entire area of the backlight. If the backlight is only partially covered, the brightness gain decreases due to some of the light that is reflected back from the polarizer subsequently escaping from the system.

The cross over angle of a display comprising an inventive broadband reflective polarizer is preferably at least 40°, particularly preferably at least 50°. Preferably no cross over angle is observed within a 60° cone of viewing angles.

The colour difference ($\Delta E^*_{uv}$ in the CIE 1976 L*u*v* colour space) of a display comprising an inventive reflective broadband polarizer is preferably lower than that of a display that comprising a state of the art broadband polarizer for viewing angles from 0° to 90°, i.e. for all possible viewing angles.

Apart from backlit displays, the reflective polarizer and the polarizer combination according to the present invention can also be applied in a reflective display, which instead of an electric light source makes use of a reflector that reflects light generated outside the display. The invention thus also relates to a reflective liquid crystal display device comprising an inventive reflective polarizer.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, all temperatures are set forth uncorrected in degrees Celsius and unless otherwise indicated, all parts and percentages are by weight. All physical properties given are given for a temperature of 20° C. unless explicitly stated otherwise. The following and the foregoing abbreviations are used to illustrate the liquid crystalline phase behavior of the compounds:

C=crystalline; N=nematic; S=smectic; Ch=cholesteric; I=isotropic. The numbers between these symbols indicate the phase transition temperatures in degree Celsius.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure of all applications, patents and publications, cited above, and of European Application 98116104.5 filed Aug. 26, 1998, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

In all of the examples, the polymerizable mesogenic material has a less ordered mesophase at a temperature or in a temperature range where the polymerized material has a more highly ordered thermodynamically stable mesophase.

EXAMPLES

Example 1

The reactive mesogen of formula I-1 was mixed with 0.5% of the photoinitiator TPO (Lucirin® TPO from BASF, Ludwigshafen, Germany) of the formula

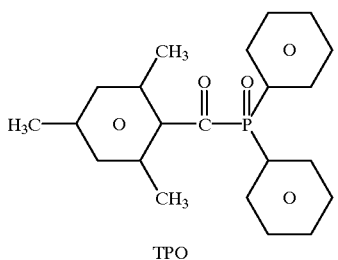

TPO and various concentrations of the thiol compound of formula III-1 ranging from 0.5% to 3% in steps of 0.5% absolute. The original mixture without the thiol is called mixture A, the resultant mixtures are labelled mixtures B to G. The composition of the 7 mixtures are given in table 1 below.

TABLE 1

| Composition of mixtures | | | |
|---|---|---|---|
| Compound: Mixture | I-1 c/% | III-1 c/% | TPO c/% |
| A | 99.5 | 0.0 | 0.5 |
| B | 99.0 | 0.5 | 0.5 |
| C | 98.5 | 1.0 | 0.5 |
| D | 98.0 | 1.5 | 0.5 |
| E | 97.5 | 2.0 | 0.5 |
| F | 97.0 | 2.5 | 0.5 |
| G | 96.5 | 3.0 | 0.5 |

All seven mixtures showed a selective reflection of blue light after orientation by shearing between glass substrates, separated by 5 μm at a temperature of 80° C. The samples were all polymerized under 1.6 mW/cm² UV irradiation. The resultant samples were investigated with respect to their reflection of light. In particular the lower and the upper limit of the band of reflected wavelength was determined. The values for the minimum and for the maximum wavelength reflected were taken at half light of the maximum reflection. Further the central wavelength of the reflection band was determined as the average of the respective upper and lower limits of the individual samples.

Figure 3:
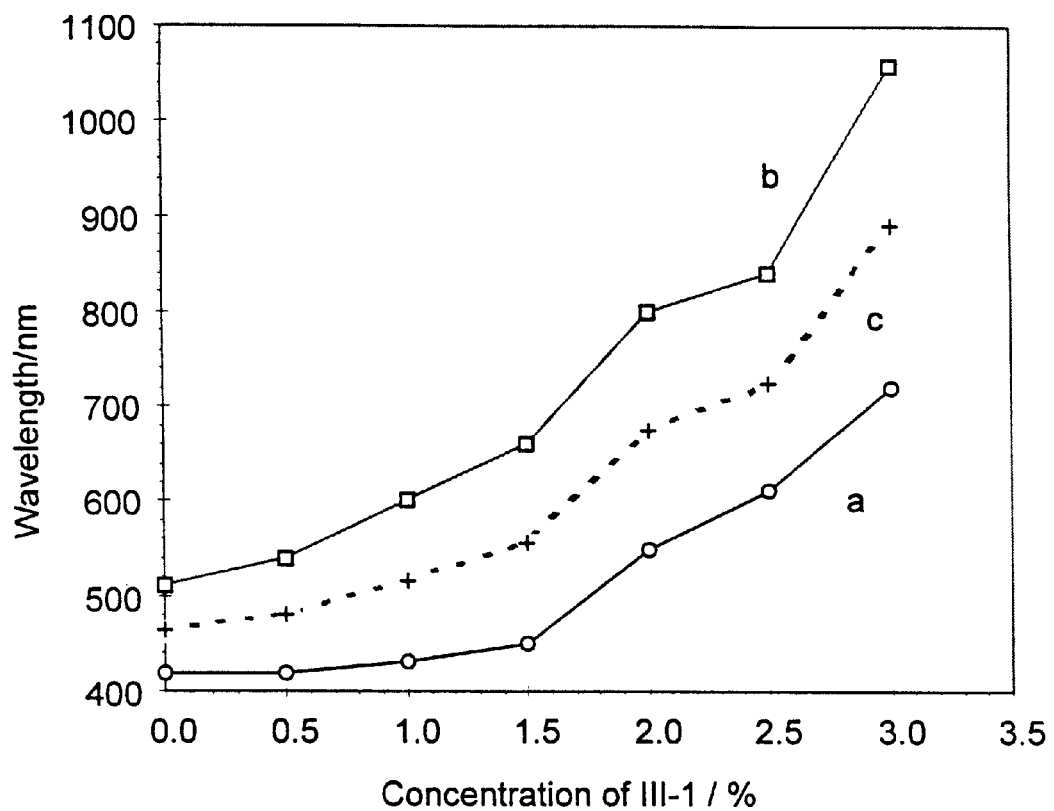
FIG. 3 shows the edges of the reflected wavelength band and the central wavelength of the reflection band of films prepared with different amounts of chain transfer agents according to example 1.

FIG. 3 depicts the minimum (a), maximum (b) and average (c) wavelength as a function of the concentration of the thiol compound III-1. It can be seen that the wavelength of light reflected by the reflective films is increasing with increasing concentration of the thiol compound. The central wavelength reflected is varied from 460 nm in the sample with mixture A to 900 nm for the sample with mixture G. Further the bandwidth of reflected wavelength is slightly broader in the samples with thiol added compared to the sample without thiol.

It has to be added here, however, that the sample using mixture G showed slight scattering of light, which might be indicating the appearance of a smectic texture.

Example 2

Samples similar to that of mixture G of example 1 were prepared. But now the polymers were crosslinked to various degrees by the addition of a bisacrylate of formula II-1 as a crosslinking agent in different amounts ranging from 1% to 5%.

The compositions of the resultant mixtures H to K are given in table 2 together with that of mixture G of example 1.

TABLE 2

| Composition of mixtures | | | | |
|---|---|---|---|---|
| Compound: Mixture | I-1 c/% | III-1 c/% | TPO c/% | II-1 c/% |
| G | 96.5 | 3.0 | 0.5 | — |
| H | 95.5 | 3.0 | 0.5 | 1.0 |
| I | 94.5 | 3.0 | 0.5 | 2.0 |
| J | 93.5 | 3.0 | 0.5 | 3.0 |
| K | 91.5 | 3.0 | 0.5 | 5.0 |

5 μm thick films of these mixtures between glass substrates were polymerized by exposure to UV light of three discrete irradiation powers of 1.6, 0.7 and 0.2 mW/cm² respectively. The colour reflected by each sample was found to depend both on the quantity of the cross linking it, agent and on the curing power used as summarized in table 3 below.

TABLE 3

| Colour of reflected light | | | | |
|---|---|---|---|---|
| | (II-1) | | power/mW/cm² | |
| Mixture | c/% | 1.6 | 0.7 | 0.2 |
| G | — | red | deep red | scattering |
| H | 1.0% | orange | red | deep red |
| I | 2.0% | green | yellow | red |
| J | 3.0% | blue | blue/green | green/yellow |
| K | 5.0% | blue | blue | blue/green |

Curing occurred quickly for all samples. It was completed in less than 15 seconds even for the lowest curing power.

Example 3

The reactive mesogen mixture L was prepared.

TABLE 4

| Composition of mixture L | |
|---|---|
| Compound | c/% |
| I-1 | 82.96 |
| II-1 | 15.00 |
| III-1 | 3.00 |
| TPO | 0.04 |

Thin samples (5 μm) of t his mixture were prepared between glass substrates, oriented by shearing and polymerized by UV irradiation of various powers at a constant temperature of 90° C. for 30 seconds.

Figure 4:
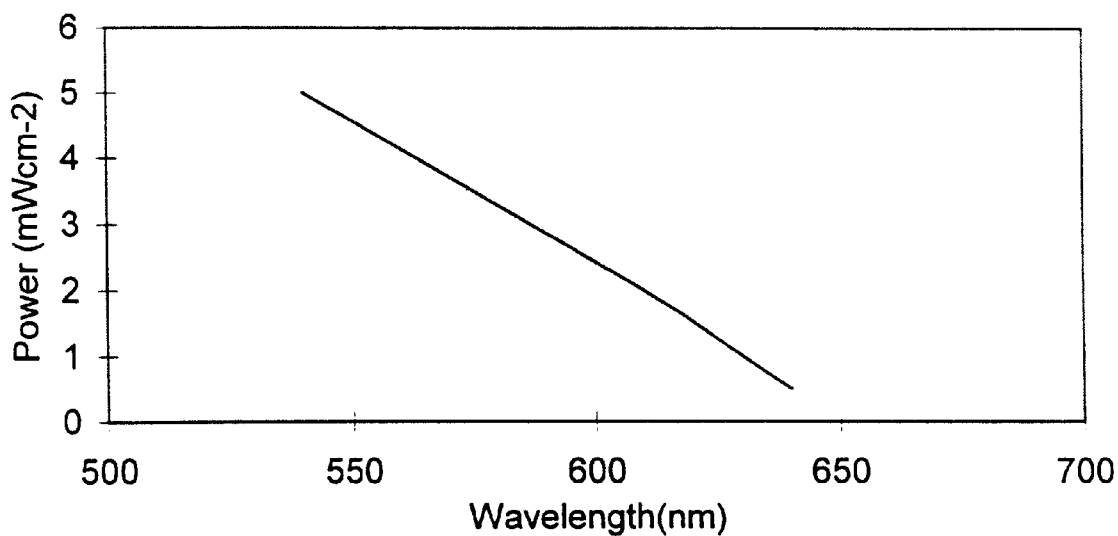
FIG. 4 shows the central wavelength of the reflection band of reflective films according to example 3 as a function of the curing power.

The resultant samples represented a set of narrow wave band layers with a range of wave lengths which were determined by the curing power used. This is shown in FIG. 4, depicting the central reflection wavelength of different samples prepared from mixture L as a function of the irradiation power used for polymerization.

Example 4

In contrast to the examples above now reflective films with a broader bandwidth were prepared as follows: A sample of the reactive mesogen mixture of example 3, mixture L, was doped with 3% of an UV absorbing dye Tinuvin 400 (Ciba Geigy, Switzerland). The resultant mixture, mixture M, was filled as a 15 μm thick film between two glass substrates and oriented by shearing. Curing was effected by exposure to 5 mW/cm² at a constant temperature of 90° C. for 30 seconds.

Figure 5:
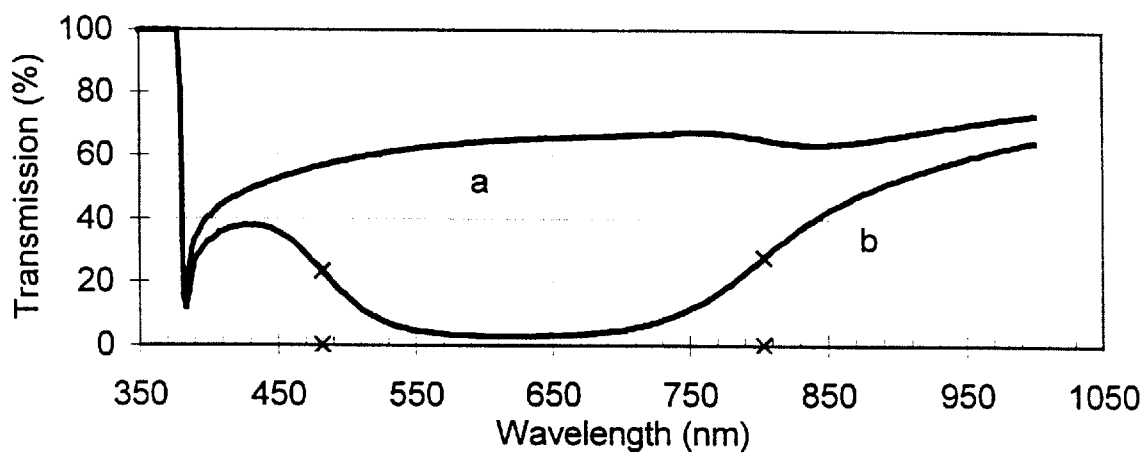
FIGS. 5 to 8 show the transmission spectrum of a broadband reflective polarizer according to examples 4 to 7 respectively, with (a) indicating the transmitted and (b) the reflected light.

In order to characterize the broad band polarizating properties of the reflective film its transmission spectrum was determined subsequently with left and with right handed circularity polarized light. The spectrum is shown in FIG. 5, with (a) indicating the transmitted and (b) the reflected light.

Example 5

Similar to example 4 a broadband reflective polarizer was prepared as follows: The reactive mesogen mixture, mixture N, was prepared.

TABLE 5

| Composition of mixture N | |
|---|---|
| Compound | Concentration/% |
| I-1 | 84.1 |
| II-2 | 11.0 |
| III-1 | 4.5 |
| TPO | 0.4 |

Figure 6:
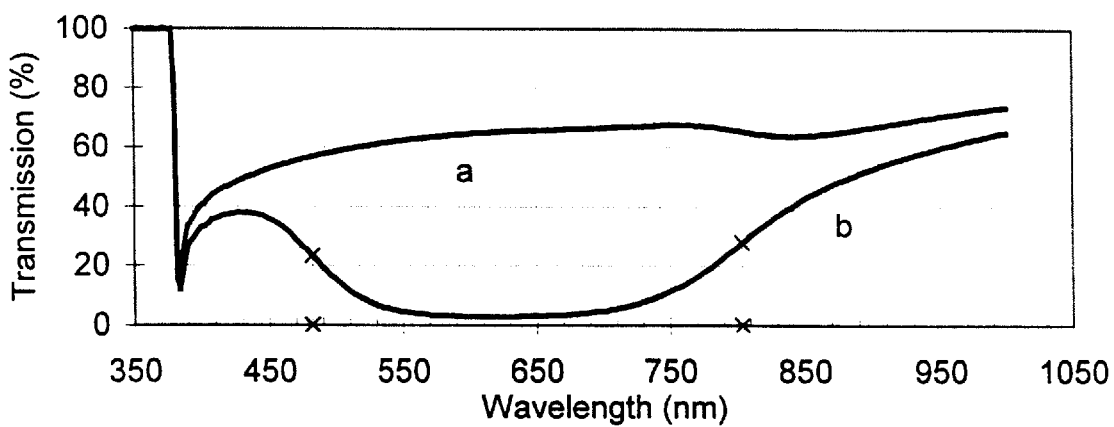

1.5% of Tinuvin 400 was added to this mixture N and 15 μm thick film of the resultant mixture O was prepared between glass slides, which was oriented by shearing. This film was irradiated at 5 mW/cm² at a constant temperature of 90° C. for 30 seconds. The transmission spectrum was determined as described in example 4 with left- and right-handed circularly polarized light, and is shown in FIG. 6, with (a) indicating the transmitted and (b) the reflected light.

Example 6

The following polymerizable mixture was formulated

| | |
|---|---|
| I-1 | 52.0% |
| I-3 | 17.9% |
| II-1 | 22.0% |
| III-2 | 5.0% |
| IV-1 | 1.5% |
| AZX | 1.0% |
| TPO | 0.3% |
| Irgacure 651 ® | 0.3% |

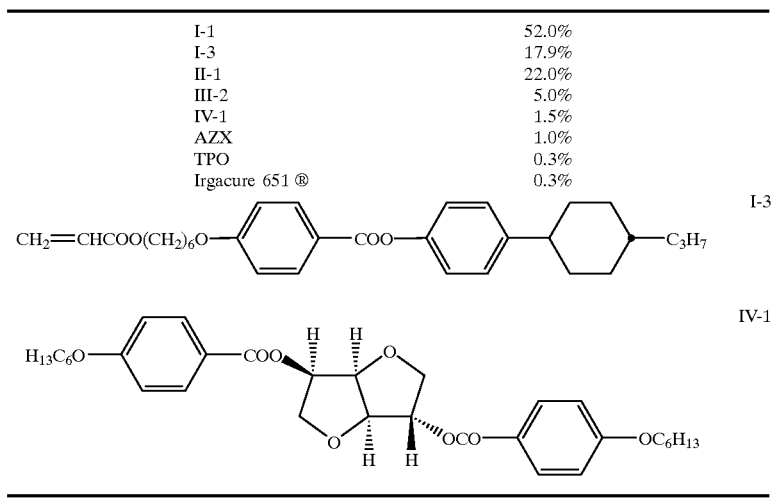

Compound I-3 and its preparation are described in GB 2,280,445. The chiral dopant IV-1 and its preparation are described in WO 98/00428. AZX (4,4'-azoxyanisole) is a commercially available UV dye. TPO (2,4,6-trimethylbenzoyl-diphenylphosphine oxide) and Irgacure 651 ® are commercially available photoinitiators.

The mixture was dissolved in toluene (50% solids) and coated to a PET substrate that was covered by a PVA oxygen barrier layer, to give a 10 μm film after evaporation of the solvent. A second PET/PVA substrate was placed on top of the layer. The film was irradiated at 0.8 mW/cm² at a constant temperature of 90° C. for 1 minute to give a broadband reflective polymer film.

The optical performance of the film was measured on an edge-lit backlight (12.1 inch) with a homeotropic compensator having a retardation of 125 nm at 40° viewing angle (as described in WO 98/00475), a PVA quarter wave foil with a retardation of 140 nm and a standard type linear polarizer.

Figure 7:
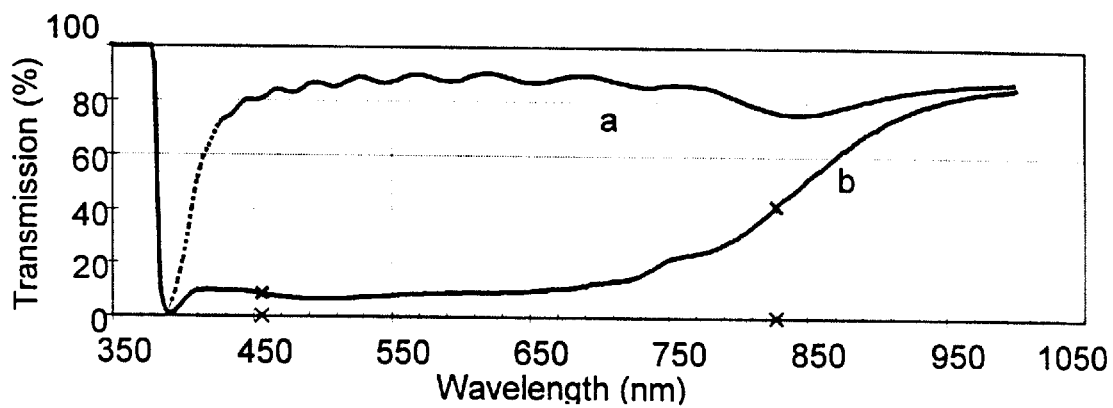

The transmission spectrum measured with left- and right-handed circularly polarized light of the resulting film is shown in FIG. 7, with (a) indicating the transmitted and (b) the reflected light.

The brightness gain for a 35 mm square sample was measured as 31% at 0° viewing angle, with no cross-over angle within a 60° cone of viewing angles. Chroma in the horizontal direction at 45° was 5.3 and on-axis colour was 0.0026 measured on the CIE 1976 diagram.

Example 7

The following polymerizable mixture was formulated

| | |
|---|---|
| I-4 | 66.4% |
| II-1 | 22.0% |
| III-2 | 5.0% |
| IV-1 | 3.0% |
| IV-2 | 2.0% |
| AZX | 1.0% |
| TPO | 0.3% |
| Irgacure 651 ® | 0.3% |

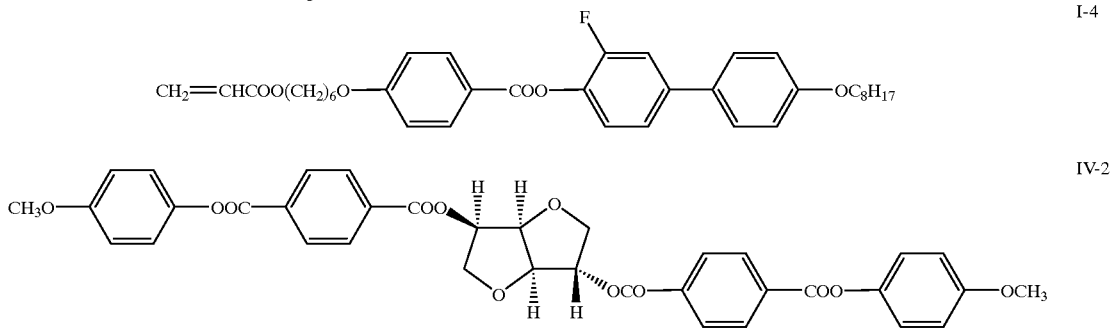

Compound I-4 can be prepared as described in GB 2,280, 445.

A broadband reflective polymer film was prepared and its optical performance measured as described in example 6.

Figure 8:
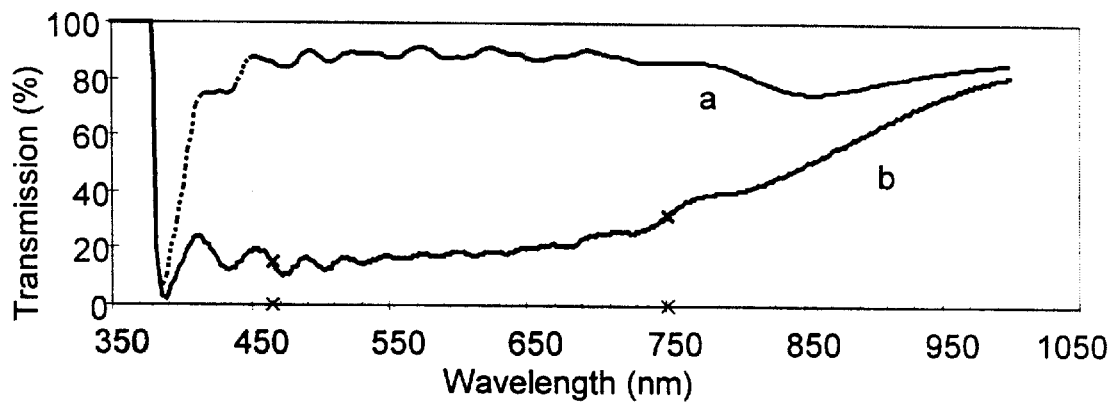

The transmission spectrum measured with left- and right-handed circularly polarized light of the resulting film is shown in FIG. 8, with (a) indicating the transmitted and (b) the reflected light.

The brightness gain was as 31% at 0° viewing angle, with no cross-over angle within a 60° cone of viewing angles. Chroma in the horizontal direction at 45° was 6.1 and on-axis colour was 0.0064 measured on the CIE 1976 diagram.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various conditions and usages.

What is claimed is:

1. A process for preparing a reflective film comprising a polymerized mesogenic material with helically twisted structure and varying helical pitch, which comprises polymerizing a polymerizable mesogenic material in its helically twisted mesophase, wherein the pitch variation is achieved by polymerizing at an essentially constant temperature where the polymerizable mesogenic material has a less ordered mesophase and the polymerized material has a more highly ordered thermodynamically stable mesophase.

2. The process of claim 1, wherein the polymerizable mesogenic material comprises
   a) at least one chiral or achiral polymerizable mesogenic compound,
   b) at least one chiral compound, which can also be one of the compounds of component a), d), e) or f),
   c) at least one polymerization initiator,
   d) optionally at least one crosslinking agent,
   e) optionally at least one chain termination or chain transfer agent,
   f) optionally a dye component comprising at least one dye, the amount and type of components c) and/or d) and/or e) and/or f) being selected to result in the film having varying helical pitch.

3. The process of claim 1, which comprises coating the polymerizable mesogenic material in the form of a layer onto a substrate or between two substrates, polymerizing the material by exposure to actinic radiation, and optionally removing the substrates or, in case two substrates are present, one or two of the substrates from the polymerized material, wherein the pitch variation in the film is achieved by varying the irradiation power of the actinic radiation in different regions of the layer of polymerizable material.

4. The process of claim 1, wherein polymerization is carried out at a temperature where the polymerizable mesogenic material has a helically twisted mesophase and the polymerized material has an untwisted thermodynamically stable mesophase.

5. The process of claim 1, wherein the polymerizable mesogenic material exhibits a cholesteric phase and a smectic phase, the smectic phase being exhibited at temperatures below which the cholesteric phase is exhibited.

6. The process of claim 2, wherein the polymerizable mesogenic material comprises at least one chain termination or chain transfer agent e).

7. The process of claim 2, wherein the polymerizable mesogenic material comprises at least one crosslinking agent d).

8. The process of claim 2, wherein the polymerizable mesogenic material comprises a dye component f).

9. A process for preparing a reflective film comprising a polymerized mesogenic material with helically twisted structure and varying helical pitch, which comprises polymerizing a polymerizable mesogenic material in its helically twisted mesophase, wherein the pitch variation is achieved by polymerizing a polymerizable mesogenic material comprising
   a) at least one chiral or achiral polymerizable mesogenic compound, b) at least one chiral compound, which can also be one of the compounds of component a), d), e) or f), c) at least one polymerization initiator, d) optionally at least one crosslinking agent, e) optionally at least one chain termination or chain transfer agent, f) optionally a dye component comprising at least one dye, the amount and type of components c) and/or d) and/or e) and/or f) being selected to result in a film having varying pitch.

10. The process of claim 9, wherein the polymerization is conducted at an essentially constant temperature.

11. The process of claim 9, which comprises coating a polymerizable mesogenic material in the form of a layer onto a substrate or between two substrates, polymerizing the material by exposure to actinic radiation, and optionally removing the substrates or, in case two substrates are present, one or two of the substrates from the polymerized material, wherein the pitch variation in the film is achieved by varying the irradiation power of the actinic radiation in different regions of the layer of polymerizable material.

12. The process of claim 9, wherein the polymerizable mesogenic material comprises at least one chain termination or chain transfer agent e).

13. The process of claim 9, wherein the polymerizable mesogenic material comprises at least one crosslinking agent d).

14. The process of claim 9, wherein the polymerizable mesogenic material comprises a dye component f).

* * * * *